(12) United States Patent
Park et al.

(10) Patent No.: US 8,704,914 B2
(45) Date of Patent: Apr. 22, 2014

(54) APPARATUS TO AUTOMATICALLY TAG IMAGE AND METHOD THEREOF

(75) Inventors: Wan-je Park, Seoul (KR); Dae-hong Ki, Suwon-si (KR); Hyun-kook Jang, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 392 days.

(21) Appl. No.: 12/619,902

(22) Filed: Nov. 17, 2009

(65) Prior Publication Data

US 2010/0157096 A1    Jun. 24, 2010

(30) Foreign Application Priority Data

Dec. 18, 2008  (KR) ................................ 2008-129406

(51) Int. Cl.
*H04N 5/76* (2006.01)
(52) U.S. Cl.
USPC .................................................... 348/231.99
(58) Field of Classification Search
None
See application file for complete search history.

(56) References Cited

U.S. PATENT DOCUMENTS

| | | | | |
|---|---|---|---|---|
| 2005/0243187 A1* | 11/2005 | Watanabe et al. | ........... | 348/231.2 |
| 2006/0098105 A1* | 5/2006 | Okisu et al. | ............. | 348/231.99 |
| 2007/0098303 A1* | 5/2007 | Gallagher et al. | ............ | 382/305 |
| 2007/0239683 A1* | 10/2007 | Gallagher | ......................... | 707/3 |
| 2007/0239778 A1* | 10/2007 | Gallagher | .................. | 707/104.1 |
| 2007/0253025 A1 | 11/2007 | Terayoko | | |
| 2008/0033983 A1 | 2/2008 | Ko | | |
| 2008/0069449 A1 | 3/2008 | Cho et al. | | |
| 2008/0129728 A1* | 6/2008 | Satoshi | ......................... | 345/419 |
| 2008/0170806 A1* | 7/2008 | Kim | .............................. | 382/285 |
| 2008/0218595 A1* | 9/2008 | Kawahara | .................. | 348/222.1 |

FOREIGN PATENT DOCUMENTS

| | | |
|---|---|---|
| CN | 101063977 | 10/2007 |
| CN | 101101779 | 1/2008 |
| CN | 101150649 | 3/2008 |

OTHER PUBLICATIONS

Chinese Office Action dated Jun. 5, 2013 issued in CN Application No. 200910262432.9.
Chinese Office Action dated Feb. 13, 2014 issued in CN Application No. 200910262432.9 (Previously Submitted).
Chinese Office Action dated Feb. 13, 2014 issued in CN Application No. 200910262432.9.

* cited by examiner

*Primary Examiner* — Justin P Misleh
(74) *Attorney, Agent, or Firm* — Stanzione & Kim, LLP

(57) ABSTRACT

An apparatus to automatically tag an image and a method thereof conveniently classifies images by acquiring information of a tag image when an image is photographed and stored, automatically adding tag information to the photographed image based on the information of a tag image, generating an image file, and storing the image file. The apparatus and method acquire an image and record a photographed image based on classification information of an image which is automatically tagged when the image is acquired and stored.

23 Claims, 12 Drawing Sheets

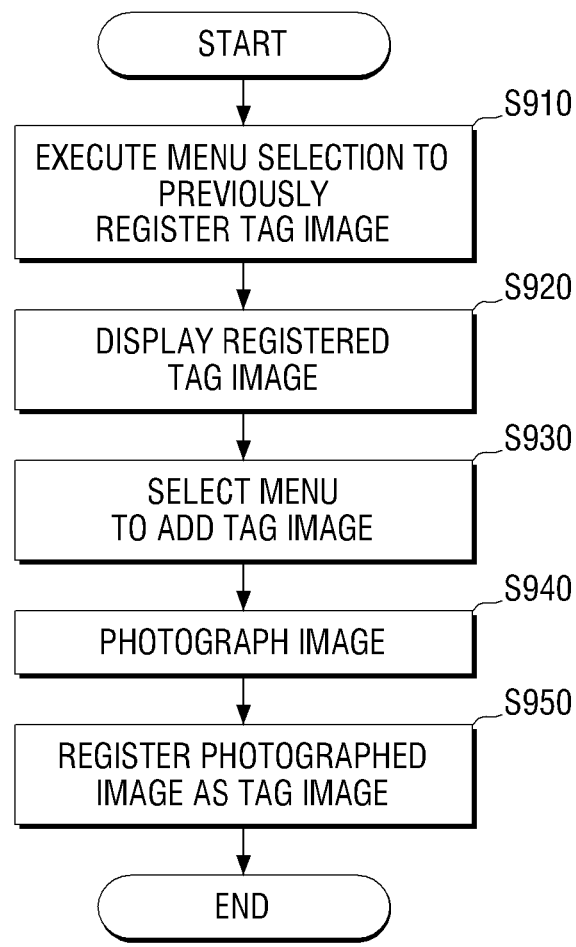

APPARATUS TO AUTOMATICALLY TAG IMAGE AND METHOD THEREOF

CROSS-REFERENCE TO RELATED APPLICATIONS

This application claims priority under 35 U.S.C. §119(a) from Korean Patent Application No. 2008-129406, filed on Dec. 18, 2008, in the Korean Intellectual Property Office, the contents of which are incorporated herein by reference in their entirety.

BACKGROUND

1. Field of the Invention

The present general inventive concept relates to an apparatus to automatically tag an image and a method thereof, and more particularly, to an image apparatus such as a digital camera or a digital camcorder which captures an image and stores the image in a file format and a controlling method thereof.

2. Description of the Related Art

With the development of image photographing techniques and digital image signal processing techniques, digital photographing apparatuses have become more common and many people widely use such digital photographing apparatuses. As digital photographing apparatuses employing mass storage devices are less restrictive than analogue photographing apparatuses in the capacity of storage media, the amount of images photographed by the digital photographing apparatuses has significantly increased. Users store photographed images classified according to each event, or output some images online or offline.

Since the amount of images generated are so numerous that it is difficult for a user to classify the images or to manage the images according to each event, a technique to automatically classify images is suggested. When a user personally classifies images, he or she desires to classify the images in a chronological order or according to an event. Accordingly, it is not easy to clearly classify images for which a user desires to search using the above manner.

The method to classify images in a chronological order according to the time when an image is photographed has been suggested. For example, images are classified for each date using information regarding the time added to the images, and the images are shown in a calendar format. However, as such a conventional method simply classifies images for each date, there is a problem that it is impossible to classify the images photographed on the same date into different groups according to events, for example, a group of the images photographed at an office and a group of the images photographed at home.

Moreover, if a user desires to search for a specific image among a lot of images, he or she must personally check all of the images and thus very long time is wasted.

SUMMARY

The present general inventive concept provides an image apparatus to acquire information regarding a tag image when photographing an image and storing the image, to automatically add tag information to the photographed image based on the information, to generate a file of images, and to store the file, and accordingly to easily classify a lot of images, and a controlling method thereof.

Additional features and utilities of the present general inventive concept will be set forth in part in the description which follows and, in part, will be obvious from the description, or may be learned by practice of the general inventive concept.

Exemplary embodiments of the present general inventive concept may also be achieved by providing a photographing apparatus, including a photographing unit to photograph an object and to generate an image, a storage unit to store the image generated by the photographing unit as a tag image, a display unit to display the photographed image, and a controlling unit to add the stored tag image to another photographed image as tag information.

The display unit may display the tag information together with the other photographed image.

The storage unit may include at least one of an internal memory and an external memory.

Exemplary embodiments of the present general inventive concept may be achieved by providing an image photographing method, including registering an image as a tag image, and if an image is photographed using the registered image as tag information, automatically tagging the tag image to the photographed image.

The image photographing method may further include displaying the tag image on an area of a photographed image while the image is photographed.

If the image registered as a tag image is a new image, automatically tagging the photographed image with the tag image.

The registering a tag image further includes the process of selecting a pre-stored image to register as a tag image.

The registering a tag image may further include determining whether it is possible to recognize a shape of an image to be registered as a tag image, and if the shape is recognized as a pre-stored image, registering the pre-stored image as the tag image, and if the shape is not recognized as a pre-stored image, registering the image as a new tag image.

If the shape is not recognized as a pre-stored image, the image may be recognized using at least one of layout information and color information, and the image may be registered as a tag image.

The registering a tag image may further include registering the pre-stored image as a tag image or a new tag image.

Exemplary embodiments of the present general inventive concept may also be achieved by providing a method to previously register a tag image, including the processes of executing a menu selection to previously register a tag image; recognizing an input image through a user input; and registering the recognized image as a tag image.

The registering a tag image may include the registering the recognized image as a tag image, when at least one of the input image does not move for a predetermined period, a shutter button is depressed for a predetermined period, and a photographing button and a shutter button are concurrently pressed.

Exemplary embodiments of the present general inventive concept may also be achieved by providing a photographing method, including the processes of acquiring a tag image of a photographed image; and if a photographed image is stored, tagging and storing the photographed image with the tag image.

The acquiring a tag image may include the process of acquiring one of a pre-stored image and a currently photographed image as the tag image.

Exemplary embodiments of the present general inventive concept may also be achieved by providing a photographing apparatus, including a photographing unit; a storage unit to store an image photographed by the photographing unit; and a controlling unit to designate a tag image for the image to be photographed by the photographing unit, and to cause the tag image to be tagged to the image to be photographed and stored when the image to be photographed by the photographing unit is stored in the storage unit.

The controlling unit may designate one of a pre-stored image stored in the storage unit and the image currently photographed by the photographing unit as the tag image.

Exemplary embodiments of the present general inventive concept may also be achieved by providing a method of forming an image in a photographing apparatus, the method including photographing a first image as a first tag image, and photographing a second image to store the second image with the first tag image.

The method may further include photographing a third image as a second tag image, and photographing a fourth image to store the fourth image with the second tag image.

The second image may comprise a plurality of images, and the plurality of images may be stored with the same first tag image.

Exemplary embodiments of the present general inventive concept may also be achieved by providing a photographing apparatus, including a photographing unit to photograph a first image as a first tag image and a second image, and a controlling unit to store the second image with the first tag image.

The photographing unit may photograph a third image as a second tag image and a fourth image, and the controlling unit may store the fourth image with the second tag image.

The second image may comprise a plurality of images, and the plurality of images may be stored with the same first tag image.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 9 is a flowchart provided to illustrate the process of previously registering a tag image.

DETAILED DESCRIPTION OF THE EMBODIMENTS

Figure 1:
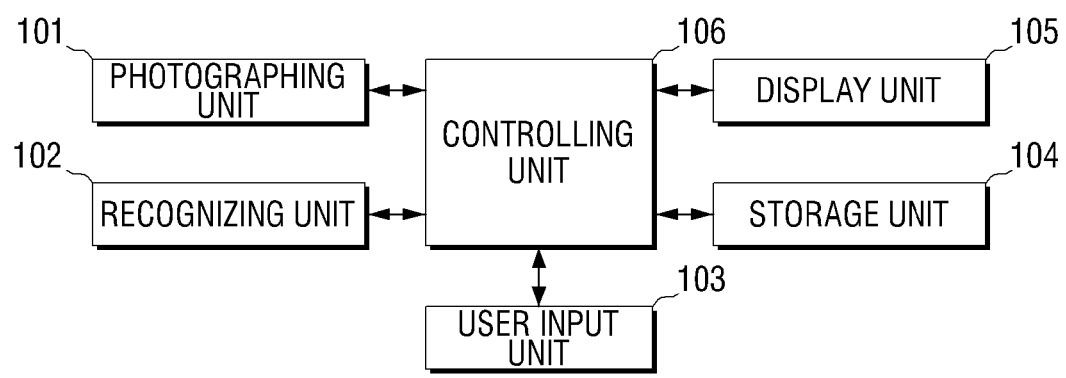
FIG. 1 is a block diagram illustrating a digital camcorder according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating a digital photographing apparatus 100 according to an exemplary embodiment of the present general inventive concept. The digital photographing apparatus 100 according to an exemplary embodiment of the present general inventive concept includes a photographing unit 101, a recognizing unit 102, a user input unit 103, a storage unit 104, a display unit 105, and a controlling unit 106. The digital photographing apparatus 100 can be, for example, a digital camera, a digital camcorder, a mobile phone with a photographing function, a personal computing device with a photographing function, or any other device capable of performing a photographing function.

The photographing unit 101 can photograph an optical image projected through a lens (not illustrated), can convert an optical signal into an electrical signal, and can generate an image signal.

The recognizing unit 102 can perform signal processing to recognize the image signal generated by the photographing unit 101. The recognizing unit 102 can read layout information, color information, and so on in order to recognize a form of the optical image, and can perform signal processing according to the read information.

The user input unit 103 can include various buttons, sliders, and/or dials through which a user can input a command. The user input unit 103 can also be implemented as a touch screen capable of receiving a command as a user input.

The storage unit 104 is a recording medium which can record a photographed image. The storage unit 104 may be implemented as an optical recording medium such as, for example, a digital versatile disk (DVD), a high-definition DVD (HD-DVD), and a Blue Ray disk (BD), a magnetic recording media such as, for example, a hard disk drive (HDD), and a semiconductor recording medium such as, for example, a memory card and a flash memory. The storage unit 104 can also be implemented as an external memory device, which can be mounted on or connected to the digital photographing apparatus 100. The storage unit 104 can be connected by a physical connection, such as cables or a connector, or it may be communicated with wirelessly, using a wireless communication protocol such as, for example, WiFi or Bluetooth. The storage unit 104 may also be implemented as two or more recording media.

However, the storage unit 104 is not limited to the exemplary embodiments of the present general inventive concept described above, and any medium to record an image signal other than the above recording media may be applied to the present general inventive concept. In addition, a tag image such as a compressed image signal may be stored in each separate recording medium.

The display unit 105 can display an image photographed by the photographing unit 101 and an image played back by the storage unit 104 so as to enable a user to view the images.

The controlling unit 106 can control the storage unit 104 to record an image photographed by the photographing unit 101. File copying, image comparing, and image editing between recording media mounted in the storage unit 104 can be controlled by the controlling unit 160. Specifically, the controlling unit 106 can control the operations to select one of tag images recognized and registered by the recognizing unit 102, automatically add tag information to the photographed image, and store the tag information together with the photographed image in the storage unit 104.

The images photographed in exemplary embodiments of the present general inventive concept can include moving images, still images of the photographed moving images, and images having tag information.

Figure 2A:
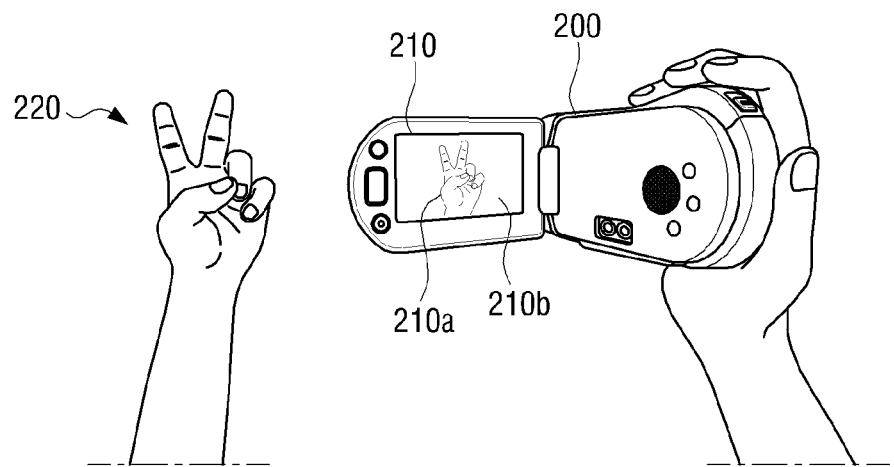
FIGS. 2A to 2C are views illustrating a user interface to register a tag image according to an exemplary embodiment of the present general inventive concept.
Figure 2B:
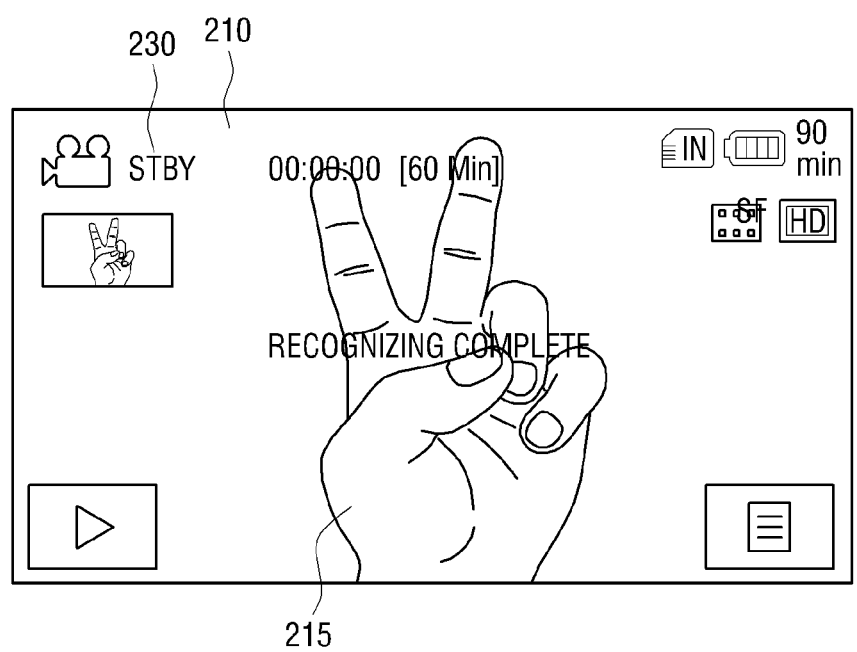
Figure 2C:
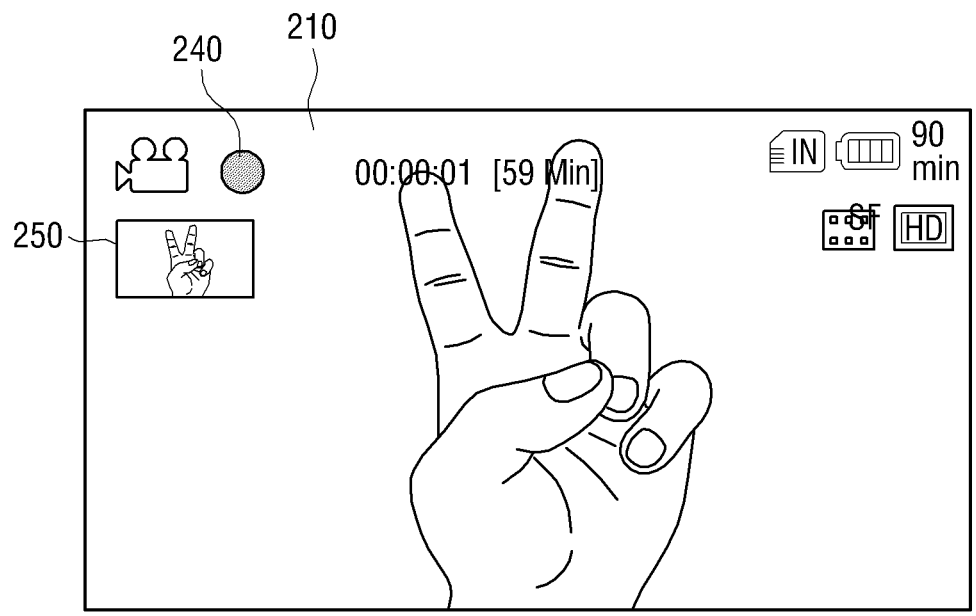

FIGS. 2A to 2C are views illustrating a user interface to register a tag image according to an exemplary embodiment of the present general inventive concepts. FIGS. 2A-2C illustrate an interface provided to a user while operations S805, S810-Y, S825-Y, S830, S835-N, and S840 are sequentially performed, which will be described below with reference to FIG. 8.

FIG. 2A illustrates the case of photographing an independent object serving as an obvious shape. The display 210 of the photographing apparatus 200 can display a standby screen to photograph, for example, two fingers 220 which can be clearly recognized by the recognizing unit 102.

The display 210 includes a screen to display an image 210a of the two fingers 220 and a background image 210b. The image 210a of the two fingers 220 can be extracted from the background image 210b.

Referring to FIG. 2B, the recognizing unit 102 completes recognizing the shape of two fingers 220 and thus the words "recognizing complete" can be displayed on the display 210, but the display shows the display state prior to recording an image. An indicator 230, such as "STBY," can be displayed to indicate that the photographing apparatus 200 is in a standby state and is not recording an image.

A tag can be registered when a screen is displayed as illustrated in FIG. 2B, that is 1) when the object does not move for a predetermined period (which can be, for example, one second), 2) when a shutter button to photograph an image is depressed for a predetermined period (such as, for example, one second), or 3) when a shutter button to photograph an image and a recording button are concurrently pressed. In this situation, the controlling unit 160 can register the photographed image 215 as a tag image of images to be photographed later.

It is possible that the image 210a of the two fingers 220 can be treated as the tag image and it is also possible that a combination of the image 210a and at least a portion of the background image 210b can be treated as the tag image.

FIG. 2C illustrates a display state when a user inputs a command to start recording an image by pressing a recording button after the registration of a tag is completed. Referring to FIG. 2C, a tag image can be displayed on a predetermined area of the display 250 while an image is recorded. An indicator 240, such as an icon, can be displayed to indicate that the photographing apparatus 200 is in a recording state to record an image.

Figure 3A:
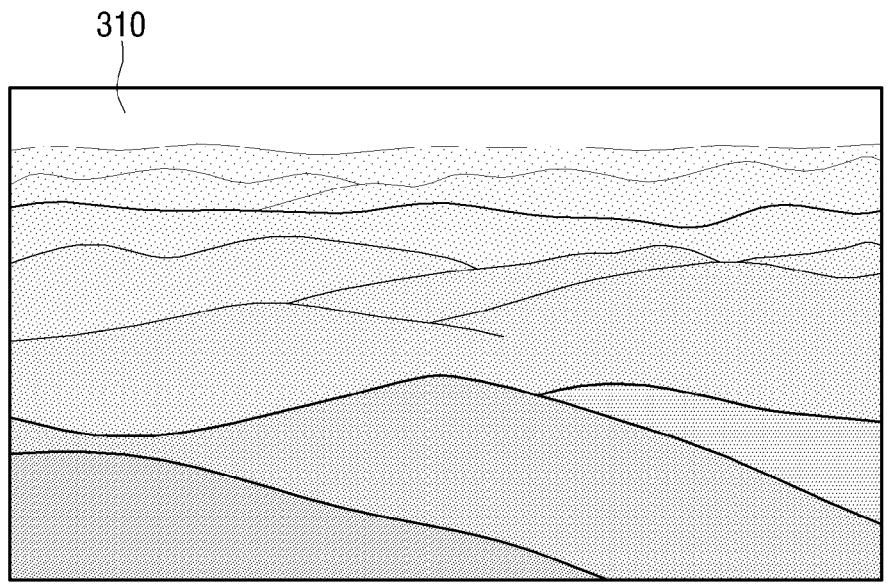
FIGS. 3A to 3C are views illustrating a user interface to register a tag image according to another exemplary embodiment of the present general inventive concept.
Figure 3B:
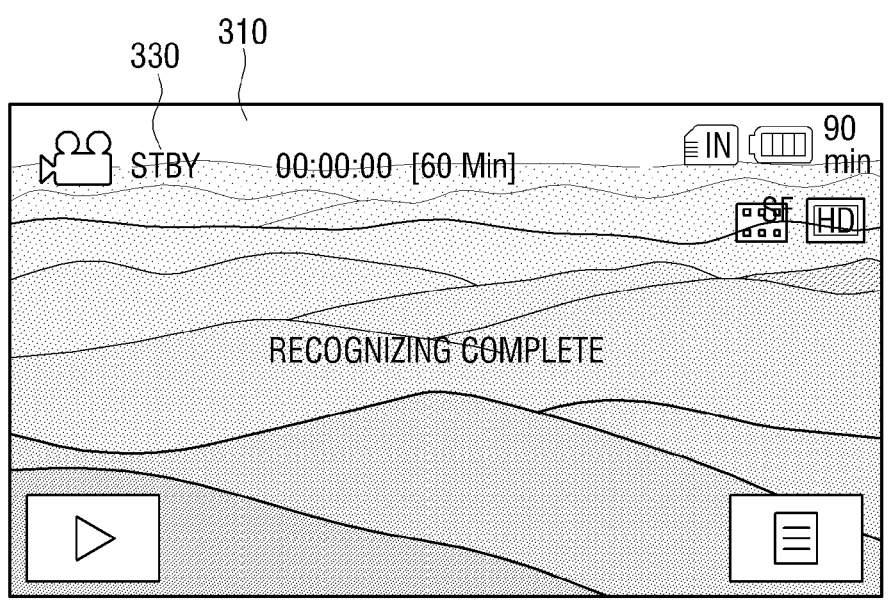
Figure 3C:
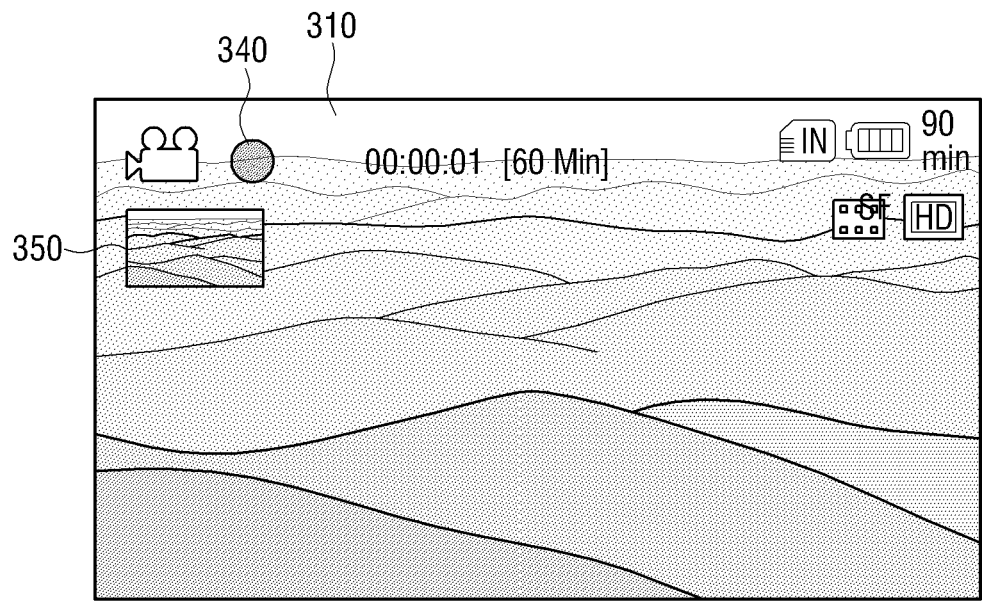

FIGS. 3A to 3C are views illustrating a user interface to register a tag image according to another exemplary embodiment of the present general inventive concept. FIGS. 3A-3C correspond to an interface provided to a user while operations S805, 5810-Y, S825-N, S860, S865-N, and S840 are sequentially performed, which will be described below with reference to FIG. 8.

FIG. 3A illustrates the case of photographing an unclear object serving as an uncertain shape. The display 310 of the photographing apparatus displays a standby screen to photograph an image which the recognizing unit 102 cannot recognize. The recognizing unit 102 can analyze an image of the unclear object using, for example, layout information, color information, and other information regarding the image.

Referring to FIG. 3B, the recognizing unit 102 completes an analysis of the shape of the image as illustrated in FIG. 2B and thus the words "recognizing complete" can be displayed on the display, but the display shows the display state prior to recording an image. That is, although the recognizing unit 102 does not recognize the shape of the image, such as illustrated in FIG. 3A, the image can be recorded and stored. An indicator 330, such as "STBY," can be displayed to indicate that the photographing apparatus 200 is in a standby state and is not recording an image.

A tag can be registered when a screen is displayed as illustrated in FIG. 3B, that is 1) when the object does not move for a predetermined period (such as, for example, one second), 2) when a shutter button to photograph an image is depressed for a predetermined period (such as, for example, one second), or 3) when a shutter button to photograph an image and a recording button are concurrently pressed. In this situation, the controlling unit 160 can register the photographed image as a tag image of images to be photographed later.

FIG. 3C illustrates a display state when a user inputs a command to start recording an image by pressing a recording button, such as described above with respect to FIG. 2C. Referring to FIG. 3C, a tag image can be displayed on a predetermined area 350 of the display 310 while an image is recorded. An indicator 340, such as an icon, can be displayed to indicate that the photographing apparatus 200 is in a recording state to record an image.

Figure 4:
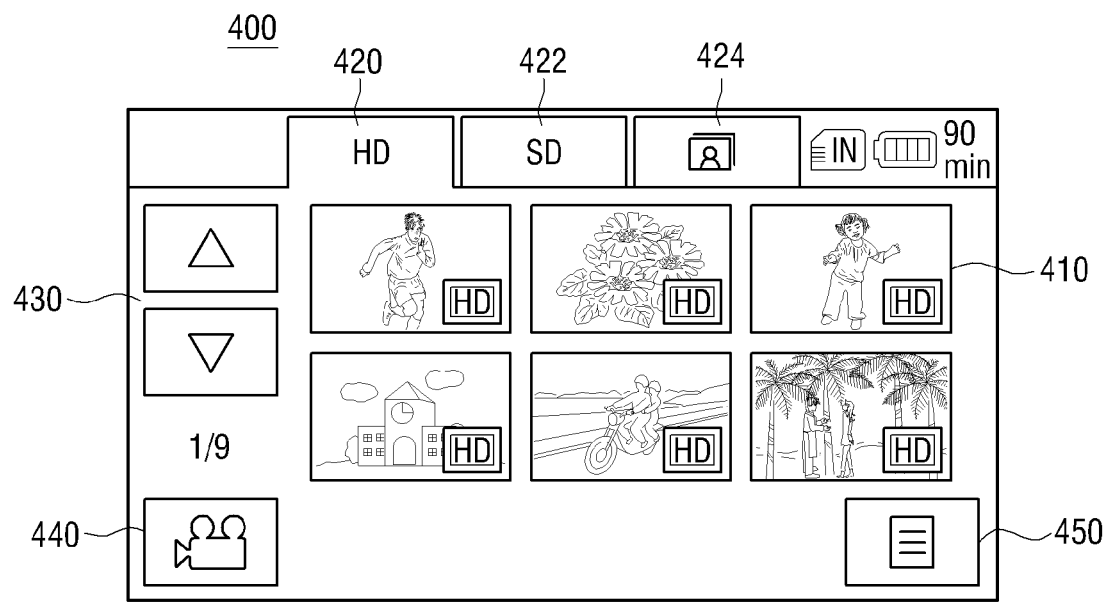
FIG. 4 is a view illustrating a user interface through which moving image files are shown classifiedly according to image quality.
Figure 5:
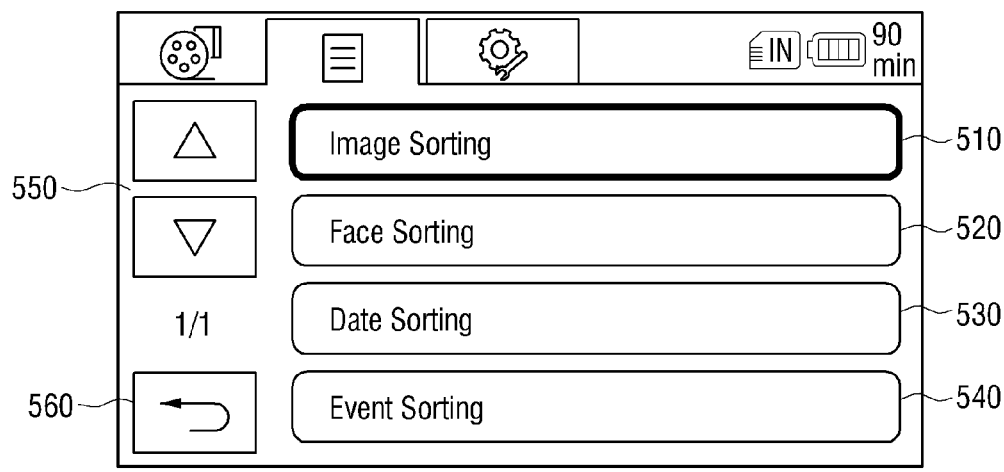
FIG. 5 is a view illustrating a user interface which is used to sort high-definition (HD) moving image files.
Figure 6:
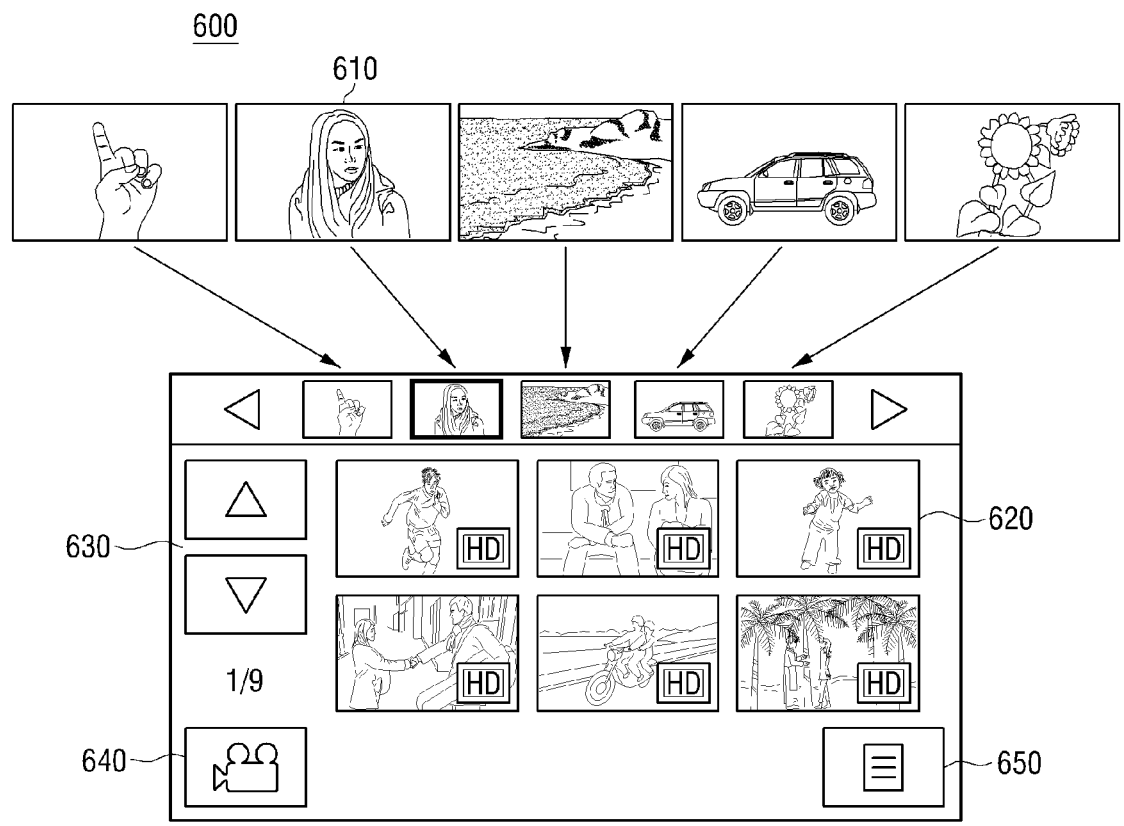
FIG. 6 is a view illustrating a user interface in which image sorting is selected.

FIGS. 4 to 6 illustrate an exemplary user interface which can be provided during the operation to search for recorded moving image files using a registered tag image.

FIG. 4 is a view illustrating a user interface 400 through which moving image files 410 can be displayed classified according to image quality. If, as illustrated in FIG. 4, the moving image files 410 are classified according to image quality, a user can selectively recognize the image files. In FIG. 4, high-definition (HD) 420 moving image files are displayed, but this is not a limitation, and the user interface 400 can also display standard definition (SD) files under tab 422, and still image files under tab 424. An indicator 440 may be displayed in user interface 400, such as an icon, to indicate the type of file being displayed, such as the movie camera icon illustrated in FIG. 4 to indicate that moving image files are currently displayed. The user interface 400 exemplarily illustrates six HD image files, but greater or fewer pictures may be displayed on the user interface 400. In addition, a user may scroll to see additional image files 410 by use of the scroll buttons 430. In addition, a user may call up menu options through the menu button 450.

FIG. 5 is a view illustrating a user interface 500 which can be used to sort image files, such as HD or SD moving image files or still image files. If a user presses a menu button 450 while the user interface 400 of FIG. 4 is displayed, a user interface 500 such as that illustrated in FIG. 5 may be displayed.

The user interface 500 of FIG. 5 displays buttons to select from among various types of sorting functions such as image sorting 510, face sorting 520, date sorting 530, and event sorting 540. A user may scroll among additional options using the scroll buttons 550, and a user may return to a previous menu by use of the return button 560.

FIG. 6 illustrates a user interface 600 which can be provided to a user when the image sorting function 510 is selected as illustrated in FIG. 5. User interface 600 illustrates moving image files 620 for which a tag image 610 is registered. Specifically, FIG. 6 illustrates moving image files 620 for which an image 610 among HD moving image files selected in FIG. 4 is registered as a tag image. That is, moving image files 620 to which the image 610 is tagged are displayed. A user may scroll among additional moving image files by use of the scroll buttons 630. An indicator 640, such as the camera icon illustrated in FIG. 6, may be displayed to indicate the type of image files displayed, for example, moving image files. A user may call up menu options through the menu button 650.

Figure 7A:
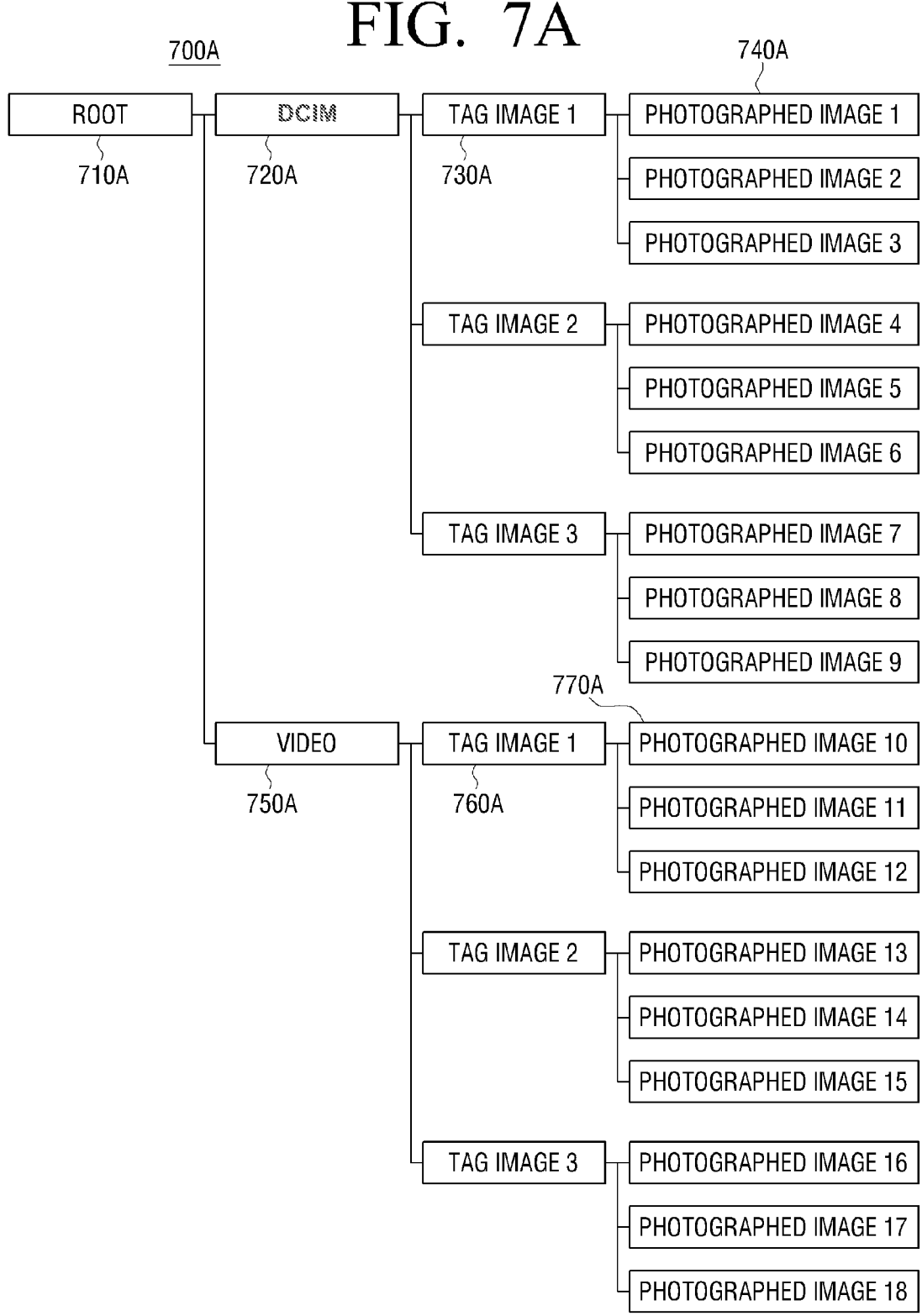
FIGS. 7A and 7B are diagrams provided to illustrate a method to store tag information to relate to moving image files.

FIG. 7A illustrates a hierarchy 700A in which photographed image files can be stored in accordance with the present general inventive concept. A root folder 710A can include super-ordinate folders 720A and 750A. The super-ordinate folders 720A and 750A can include registered tag image files 730A, 760A, and photographed image files 740A, 770A. In an exemplary embodiment, in order to search for photographed images 740A, 770A on the photographing apparatus 200, each of super-ordinate folders 720A, 750A may include sub folders 720A, 750A in which registered tag images are classified, and each of the sub folders may include corresponding moving image files 740A, 770A, to which the registered tag image is tagged, as illustrated in FIG. 7A.

Figure 7B:
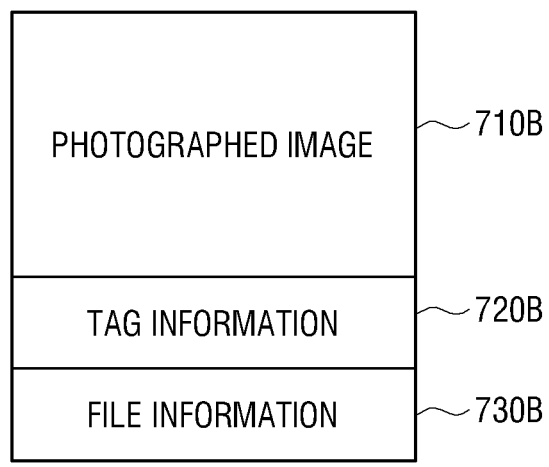

Alternatively, moving image files may contain tag information separately from photographed image and file information as illustrated in FIG. 7B. FIG. 7B illustrates a photographed image file 700B including a photographed image 710B. The photographed image file 700B can also include tag information 720B and file information 730B. The tag information 720B may be the registered tag image, or it may be a file name or an address or a tag image. The file information 730B may information about the photographed image 710B, such as a date, a time, photographic conditions under which the image was recorded, aperture, shutter speed, and recording quality.

Figure 8:
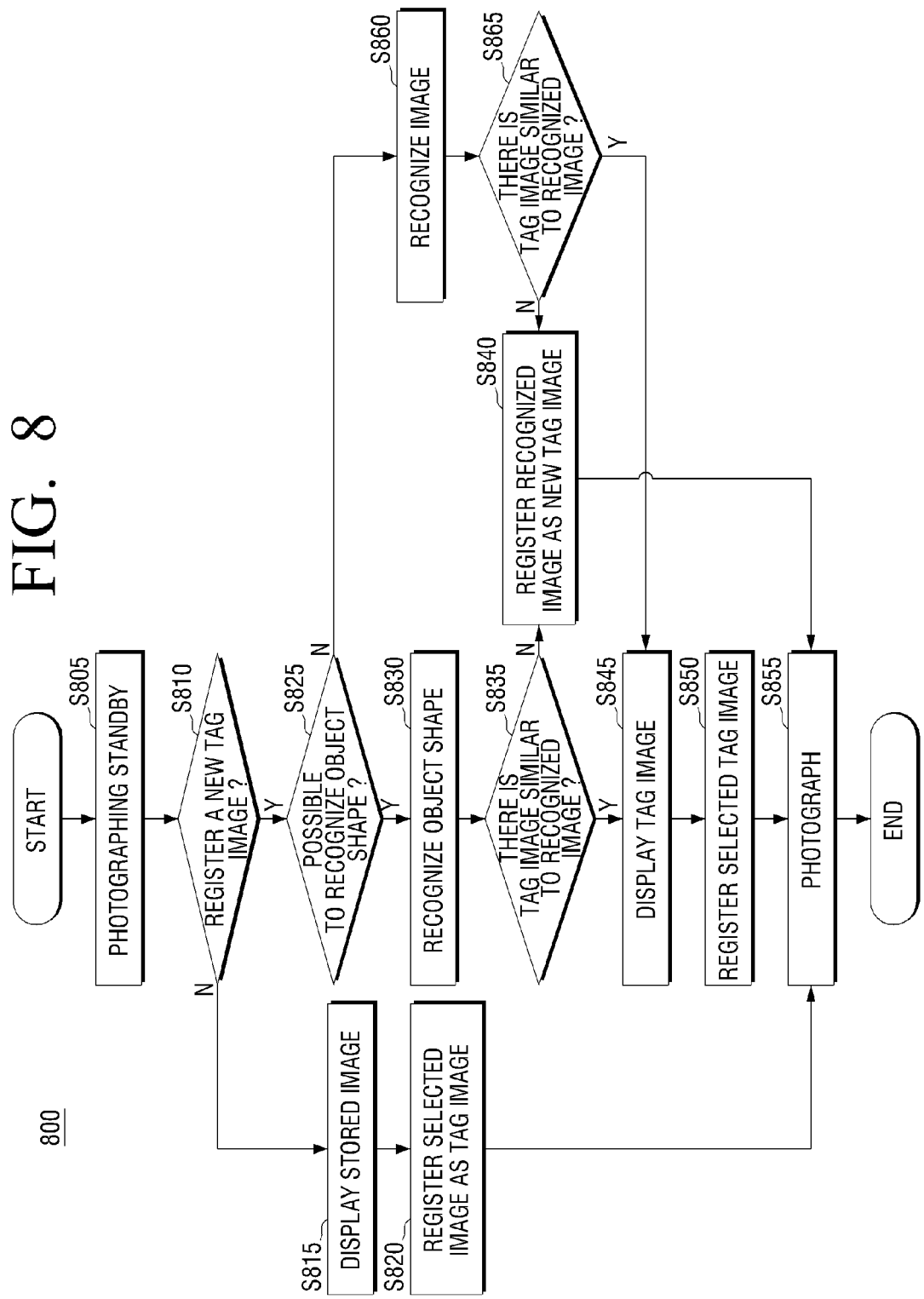
FIG. 8 is a flowchart provided to illustrate the process of registering a tag image and photographing an image using the registered tag image.

FIG. 8 is a flowchart 800 provided to illustrate the process to register a tag image for images to be photographed. FIG. 8 will be described in association with FIG. 1. If an image photographing apparatus 100 is turned on, the image photographing apparatus 100 can start up in the standby state to photograph an image in operation S805, and can receive a selection of whether or not to register a new tag image from a user in operation S810.

If a user desires to use a previously stored image as a tag image instead of registering a new tag image in operation S810-N, the images previously stored in the storage unit 104 are displayed on the display unit 105 under the control of the controlling unit 106. If a user selects an image from among the previously stored images on the display unit 105 in operation S815, the selected image is registered as a tag image in operation S820. If a user starts photographing an image in operation S855, the selected tag image is automatically tagged to the photographed image.

Alternatively, if a user desires to register a new tag image in operation S810-Y, the recognizing unit 102 determines whether or not the image input through the photographing unit 101 is recognized, for example, as an independent object or human face in operation S825. If it is possible to recognize the shape of object in operation S825-Y, the display state prior to recording an image is displayed on the display 150 as illustrated in FIG. 2B. If an object does not move for a predetermined second, if a shutter button to photograph an image is depressed for a predetermined second, or if a shutter button to photograph an image and a recording button are concurrently pressed, the recognizing unit 102 completes recognizing the image in operation S830, and determines whether or not the tag image similar to the recognized image exists in operation S835.

If there is no image similar to the recognized image in operation S835-N, the recognized image is registered as a new tag image in operation S840. If a user starts photographing an image in operation S855, the recognized image is automatically tagged to the photographed image.

Alternatively, if there is an image similar to the recognized image in operation S835-Y, the images previously stored in the storage unit 104 are displayed on the display unit 105 under the control of the controlling unit 106 in operation S845. If a user selects an image from the previously stored images on the display unit 105, the selected image is registered as a tag image in operation S850. If a user starts photographing an image in operation S855, the selected tag image is automatically tagged to the photographed image.

If a user desires to register a newly photographed image as a tag image, and if there is a need to register an unclear image which is impossible to be recognized as illustrated in FIG. 3A as a tag image in operation S825-N, the unclear image is displayed on the display unit 105 which displays a display state prior to recording an image as illustrated in FIG. 3B. If the unclear image does not move for a predetermined second, if a shutter button to photograph an image is depressed for a predetermined second, or if a shutter button to photograph an image and a recording button are concurrently pressed, the recognizing unit 102 completes recognizing the unclear image in operation S860, and determines whether or not the tag image similar to the recognized image exists in operation S865.

If there is no image similar to the recognized image in operation S865-N, the recognized image is registered as a new tag image in operation S840. If a user starts photographing an image in operation S855, the recognized image is automatically tagged for the photographed image.

Alternatively, if there is an image similar to the recognized image in operation S865-Y, the images previously stored in the storage unit 104 are displayed on the display unit 105 under the control of the controlling unit 106 in operation S845. If a user selects an image from the previously stored images on the display unit 105, the selected image is registered as a tag image in operation S850. If a user starts photographing an image in operation S855, the selected tag image is automatically tagged for the photographed image.

FIG. 9 is a flowchart provided to illustrate the process of registering a tag image in advance.

The method to previously register a tag image will be described with reference to FIGS. 1 and 9. If a user enters a command to previously register a tag image in operation S910, tag images pre-stored in the storage unit 104 are displayed on the display unit 105 in operation S920. A user enters a command (for example, makes a menu selection) to add a tag image in order to add a new tag image to the displayed tag images in operation S930. If a user presses a button to recognize an object, the image photographing apparatus photographs an image in operation S940. The image photographing apparatus stores the photographed image and registers the image as a tag image in advance in operation S950.

Accordingly, information of a tag image is acquired when an image is photographed and stored, the information can be automatically added to the photographed image based on the acquired information, and an image file having the information of a tag image can be generated. Therefore, a lot of images are conveniently classified.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in distributed fashion. The computer-readable transmission medium can transmit carrier waves and signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A photographing apparatus, comprising:
   a photographing unit to photograph an object and to generate an image from the photographed object;
   a storage unit to store the generated image generated by the photographing unit as a tag image to associate subsequent photographed images of the object with the tag image;
   a display unit to display the generated image; and
   a controlling unit to add the stored tag image as tag information to another generated image that is generated by the photographing unit to create an image file including the tag information of the stored tag image and the another generated image,
   wherein the storing of the generated image as the tag image comprises:
      determining whether it is possible to recognize a shape of the photographed object within the generated image to be saved as the tag image, and
      if the shape of the object within the photographed image is determined to be similar to a shape of the object within a pre-stored image, registering the pre-stored image as the tag image to allow the pre-stored image to be tagged to the subsequent photographed images of the object, and if the shape of the object within the photographed image is determined to not be similar to a shape of an object within the pre-stored image, registering the generated image as a new tag image.

2. The photographing apparatus of claim 1, wherein the display unit displays the tag information together with the another generated image.

3. The photographing apparatus of claim 1, wherein the storage unit comprises at least one of an internal memory and an external memory.

4. An image photographing method of forming an image in a photographing apparatus, the method comprising:
   registering a first image of an object as a tag image to associate subsequent photographed images of the object with the tag image; and
   if a second image is photographed using the registered first image as tag information, automatically adding the tag image to the photographed second image as the tag information,
   wherein the registering the first image as the tag image further comprises:
      determining whether it is possible to recognize a shape of the photographed object within the first image to be registered as the tag image, and
      if the shape of the object within the photographed image is determined to be similar to a shape of the object within a pre-stored image, registering the pre-stored image as the tag image to allow the pre-stored image to be tagged to the subsequent photographed images of the object, and if the shape of the object within the photographed image is determined to not be similar to a shape of an object within the pre-stored image, registering the first image as a new tag image.

5. The image photographing method of claim 4, further comprising:
   displaying the tag image on an area of the photographed image while the second image is photographed.

6. The image photographing method of claim 4, wherein if the image registered as the tag image is a new image, automatically tagging the photographed image with the tag image.

7. The image photographing method of claim 4, wherein the registering the tag image further comprises:
   selecting a pre-stored image to register as the tag image.

8. The image photographing method of claim 4, wherein if the shape is not recognized as a pre-stored image, the first image is recognized using at least one of layout information and color information, and the first image is registered as a tag image.

9. The image photographing method of claim 8, wherein if the first image recognized using at least one of the layout information and the color information is recognized as a pre-stored image, the pre-stored image is registered as the tag image, and if the first image recognized using at least one of the layout information and the color information is not recognized as a pre-stored image, the first image is registered as a new tag image.

10. The image photographing method of claim 4, wherein the first image includes an object image and a background image in a background of the object image, and the shape of the first image to be registered as the tag image is the shape of the object image.

11. The image photographing method of claim 4, wherein the registering a tag image further comprises:
   registering the pre-stored image as a tag image or a new tag image.

12. A method to previously register a tag image, comprising:
   executing a menu selection to previously register a tag image;
   recognizing automatically at least a portion of an input image and photographing the recognized portion of the input image when a user inputs a command to recognize a portion of the input image; and
   registering the recognized portion of the input image as a tag image, comprising:
      determining whether it is possible to recognize a shape of recognized portion of the input image to be registered as the tag image, and
      if the shape of the recognized portion of the input image is determined to be similar to a shape of a portion of a pre-stored image, registering the pre-stored image as the tag image to allow the pre-stored image to be tagged to the subsequent photographed images of the recognized portion of the input image, and if the shape of the recognized portion of the input image is determined to not be similar to a shape of a portion of the pre-stored image, registering the input image as a new tag image.

13. The method to previously register a tag image of claim 12, wherein the registering a tag image comprises:
   registering the recognized portion of the input image as a tag image when the input image does not move for a predetermined period, or when a shutter button is depressed for a predetermined period, or when a photographing button and a shutter button are concurrently pressed, or a combination thereof.

14. A photographing method, comprising:
acquiring a tag image for a photographed image including a photographed object therein; and
if the photographed image is stored, adding the tag image to the photographed image and storing the photographed image together with the tag image to associate subsequent photographed images of the object with the tag image,
wherein the storing of the photographed image together with the tag image further comprises:
determining whether it is possible to recognize a shape of the photographed object within the photographed image to be stored together with the tag image, and
if the shape of the object within the photographed image is determined to be similar to a shape of the object within a pre-stored image, storing registering the pre-stored image as the tag image to allow the pre-stored image to be tagged to the subsequent photographed images of the object, and if the shape of the object within the photographed image is determined to not be similar to a shape of an object within the pre-stored image, storing registering the photographed image together with a new tag image.

15. The photographing method of claim 14, wherein the acquiring a tag image comprises:
acquiring one of a pre-stored image and a currently photographed image as the tag image.

16. A photographing apparatus, comprising:
a photographing unit to photograph an object and to generate an image from the photographed object;
a storage unit to store the image photographed by the photographing unit; and
a controlling unit to designate a tag image for the image to be photographed by the photographing unit, and to cause the tag image to be added to the photographed image and to be stored together with the photographed image when the photographed image photographed by the photographing unit is stored in the storage unit,
wherein the storing of the photographed image together with the tag image further comprises:
determining whether it is possible to recognize a shape of the photographed object within the photographed image to be stored together with the tag image, and
if the shape of the object within the photographed image is determined to be similar to a shape of the object within a pre-stored image, registering the pre-stored image as the tag image to allow the pre-stored image to be tagged to the subsequent photographed images of the object, and if the shape of the object within the photographed image is determined to not as be similar to a shape of an object within the pre-stored image, registering the photographed image together with a new tag image.

17. The photographing apparatus of claim 16, wherein the controlling unit designates one of a pre-stored image stored in the storage unit and the image currently photographed by the photographing unit as the tag image.

18. A method of forming an image in a photographing apparatus, the method comprising:
photographing an object to generate a first image as a first tag image to associate subsequent photographed images of the object with the first tag image; and
photographing a second image to generate an image file to store the second image with the first tag image
wherein the photographing of the first image as the first tag image further comprises:
determining whether it is possible to recognize a shape of the photographed object within the first image to be photographed as the first tag image, and
if the shape of the object within the first image is determined to be similar to a shape of the object within a pre-stored image, registering the pre-stored image as the first tag image to allow the pre-stored image to be tagged to the second image of the object, and if the shape of the object within the first image is determined to not be similar to a shape of an object within the pre-stored image, registering the first image as a new tag image.

19. The method of claim 18, further comprising:
photographing a third image as a second tag image; and
photographing a fourth image to store the fourth image with the second tag image.

20. The method of claim 18, wherein the second image comprises a plurality of images, and the plurality of images are stored with the same first tag image.

21. A photographing apparatus, comprising:
a photographing unit to photograph a first image as a first tag image and a second image; and
a controlling unit to generate an image file to store the second image with the first tag image,
wherein the photographing of the first image as the first tag image further comprises:
determining whether it is possible to recognize a shape of an object within the first image to be photographed as the first tag image, and
if the shape of the object within the first image is determined to be similar to a shape of the object within a pre-stored image, registering the pre-stored image as the first tag image to allow the pre-stored image to be tagged to the second image of the object, and if the shape of the object within the first image is determined to not be similar to a shape of an object within the pre-stored image, registering the first image as a new tag image.

22. The apparatus of claim 21, wherein the photographing unit photographs a third image as a second tag image and a fourth image, and the controlling unit stores the fourth image with the second tag image.

23. The apparatus of claim 21, wherein the second image comprises a plurality of images, and the plurality of images are stored with the same first tag image.

* * * * *